Feb. 28, 1939.  R. F. JONES  2,148,471
SAFETY DEVICE FOR USE ON AIRCRAFT EMPLOYING RETRACTABLE LANDING GEAR
Filed May 8, 1937  2 Sheets-Sheet 1
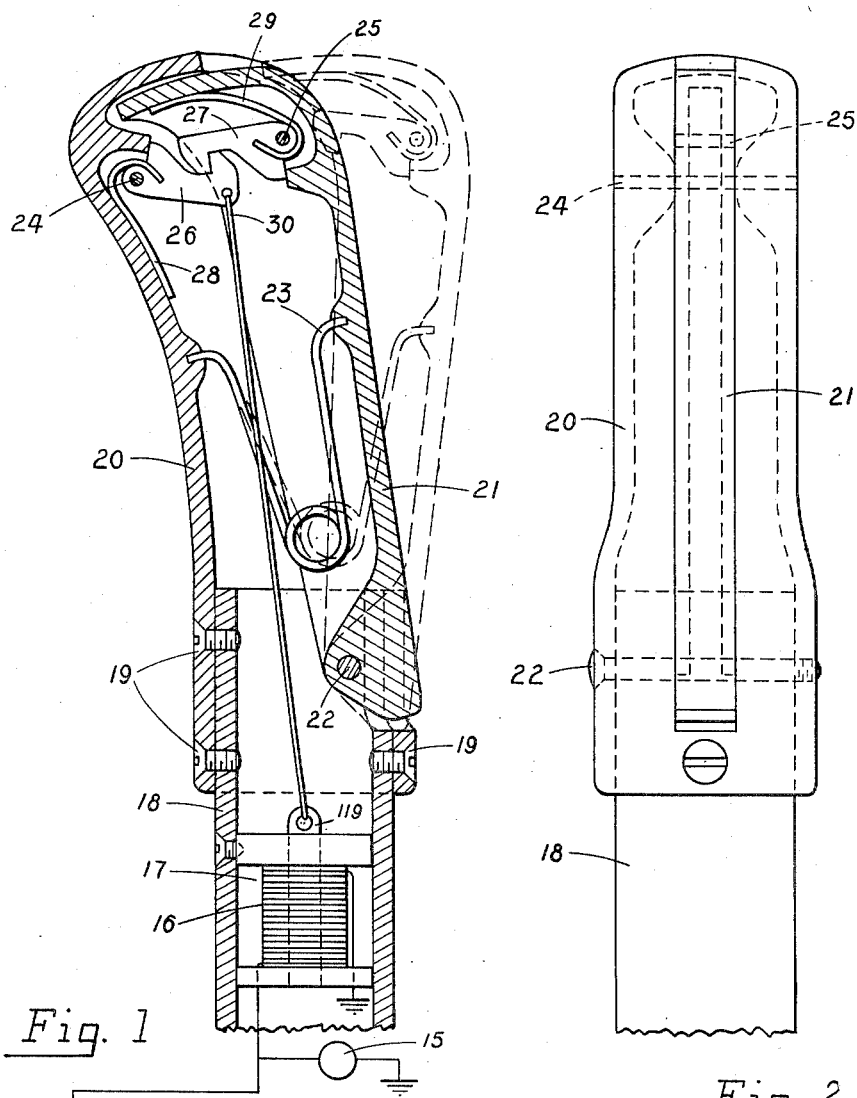
Fig. 1
Fig. 2
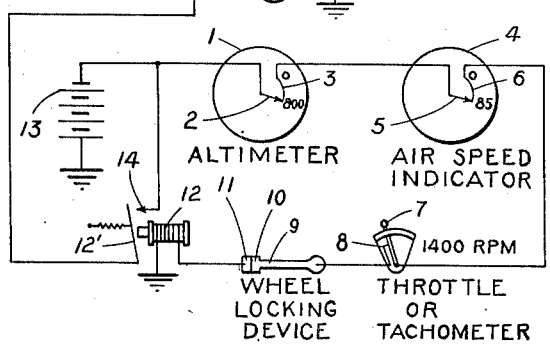
INVENTOR
ROBERT F. JONES
BY
ATTORNEY Feb. 28, 1939.   R. F. JONES   2,148,471
SAFETY DEVICE FOR USE ON AIRCRAFT EMPLOYING RETRACTABLE LANDING GEAR
Filed May 8, 1937   2 Sheets-Sheet 2

INVENTOR
Robert F. Jones
BY
Robert A. Lavender
ATTORNEY

Patented Feb. 28, 1939

2,148,471

UNITED STATES PATENT OFFICE 2,148,471

SAFETY DEVICE FOR USE ON AIRCRAFT EMPLOYING RETRACTABLE LANDING GEAR

Robert F. Jones, United States Navy

Application May 8, 1937, Serial No. 141,577

20 Claims. (Cl. 244—1)

(Granted under the act of March 3, 1883, as amended April 30, 1928; 370 O. G. 757)

My invention relates to a safety device for use on aircraft employing retractable landing gear and more particularly to such a device which will automatically advise the pilot that the landing gear is in an inoperative or retracted position when and only when the craft is in a landing condition.

Devices known heretofore for advising the pilot of a retracted or inoperative position of the landing gear have not been sufficiently forceful and hence of little marked utility since they functioned frequently to indicate landing condition when in fact such was not the case. By reason of their frequent functioning under normal operating conditions, there has been a tendency among pilots to disregard their warnings with the consequence that disastrous results have followed in an actual emergency. Failure of these prior art devices to operate satisfactorily is caused principally by the devices not being responsive simultaneously to all those factors considered essential to the establishment of a landing condition for the craft.

In carrying out my invention with a view to obviating the prior art deficiencies the parts of the safety device are arranged so that they will, as a unit, automatically advise the pilot of an inoperative or retracted position of the landing gear only when the craft is in a landing position, by which is meant a concurrence of those factors essential to effecting a landing. In order to establish a landing condition for the craft it is essential that the altitude, air speed and engine R. P. M. should not exceed certain predetermined values which are characteristic of each craft. If, now, with the landing gear retracted, the safety device will function only when the altitude, air speed and engine R. P. M. are below the predetermined values, then it is evident that the device will operate only when the craft is in a landing condition which is the desideratum. This then is the basic idea underlying my invention in which a device is provided for advising the pilot when the landing gear is in an inoperative position, the device being operative only when the altitude, air speed and engine R. P. M. of the craft are at such values as to establish a landing condition. It is at once evident that the device of my invention cannot function in its positive condition under operating conditions other than landing conditions since in such circumstances the required concurrence of altitude, air speed and engine R. P. M. will not obtain.

The means incorporated in the device of my invention which serve to advise the pilot of an inoperative position of the landing gear under landing conditions may be any of the audible and/or visual means known to the prior art. In addition or as a substitute for such means, however, I have equipped a control member of the craft with separable handle portions which are juxtaposed at least in conditions of the craft other than the landing condition but which are adapted to be forcibly separated only when the craft is in a landing condition with its retractable gear in such a position that the craft cannot be safely landed. Since the pilot's hand is constantly in contact with the separable handle portions of the control member their forcible separation constitutes a warning that cannot be ignored. The device of my invention is capable of use on any type of aircraft, that is, land planes, sea planes or amphibians, and may be employed with any type of landing gear.

With the foregoing preliminary discussion in view it is among the several objects of my invention to provide a safety device for use on aircraft employing retractable landing gear which will advise the pilot of an inoperative position of the landing gear only when the craft is in a landing condition; to provide a safety device of the stated character which will advise the pilot of an inoperative position of the landing gear only when the altitude, air speed and engine R. P. M. of the craft are of such values as to establish a landing condition; and to provide a safety device wherein the forcible separation of a plurality of handle portions of a control member serves to advise the pilot of an inoperative position of the landing gear when the craft is in a landing condition.

These and other objects and many of the attendant advantages of this invention will be readily appreciated as the same becomes better understood by reference to the following detailed description when considered in connection with the accompanying sheets of drawings wherein:

Fig. 1 is a schematic representation of one embodiment of the present invention in which the handle portions of the control member are shown in section;

Fig. 2 is a view in side elevation of the control member of Fig. 1 with its handle portions.

Figure 3:
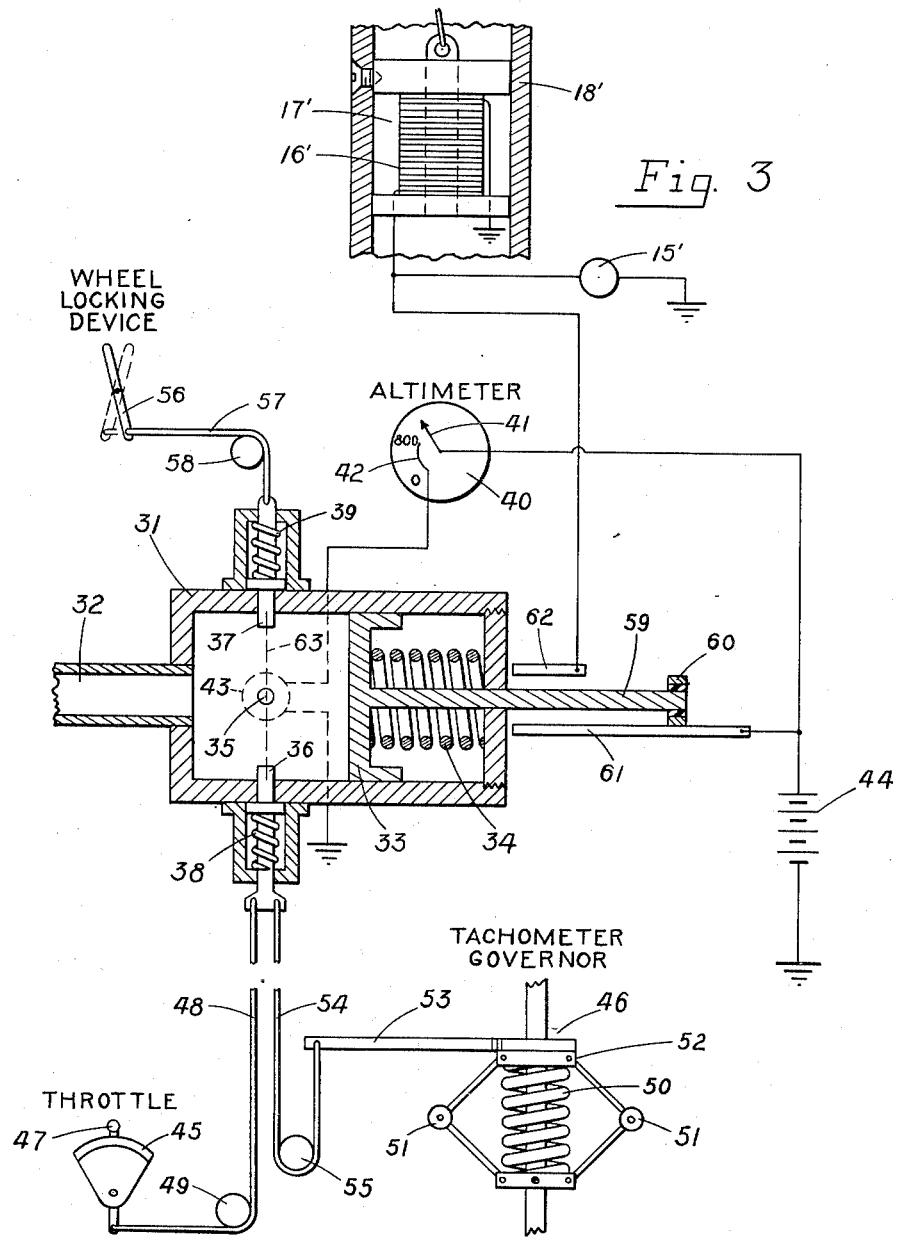
Fig. 3 is a diagrammatic view of another embodiment of the present invention.

Turning now to Fig. 1 of the drawings there is shown therein an altimeter identified by the reference character 1 which may be of any conventional type known to the prior art. This altimeter is provided with means operable to make electrical contact at and below a predetermined altitude considered essential to the establishment of a landing condition for the craft. Any convenient means may be employed for establishing such electrical contact, the means here disclosed for illustrative purposes including the pointer 2 of the meter and the arcuate contact 3. An elevation selector switch may, if desired, be associated with the altimeter so that it may be used for landing fields of any elevation. This switch of course must be set for the elevation of the field to be landed upon prior to or during flight. Similarly the air speed indicator 4, which may be of any conventional type known to the prior art, is provided with contacts 5 and 6 for making electrical engagement at or below a predetermined air speed considered essential to the establishment of the landing condition for the craft. The electrical contacts associated with the altimeter and air speed indicator in no way affect their operation and do not injure them in any manner. The handle 7 of the throttle is adapted to engage a stationary electrical contact 8 at or below a predetermined engine R. P. M. at which the craft may assume a landing condition. Inasmuch as the engine revolutions are not a function of the throttle setting under all operating conditions it may be desirable to substitute for the electrical contact making means of the throttle an electrical contact making means associated with a tachometer or other means which will make electrical contact at or below a predetermined engine R. P. M.

While the device of my invention is designed for use with any type of retractable landing gear I have shown it here used for illustrative purposes with a landing gear which is provided with the locking device 9 for locking the landing gear in its extended and operative position. The locking device 9 is shown in its inoperative or non-locking position in Fig. 1. In this position the landing gear may be extended or may be retracted but in either event it is clear that the craft cannot be safely landed. The locking device 9 is provided with electrical contacts 10 and 11 which are in engagement only when the locking device is in its unlocked position. It is to be understood, of course, that other means than that shown in Fig. 1 may be advantageously employed in any of the embodiments of my invention for making electrical contact when the landing gear is in an inoperative position. Such a means might be either manually or automatically actuated by the landing gear when it assumed a position in which the craft could not be safely landed.

The electrical contacts associated with the altimeter, air speed indicator, throttle or tachometer and the wheel locking device are serially connected in an electrical circuit which includes the solenoid 12 of a relay and a convenient source of electromotive force 13. As pointed out hereinbefore the altitude, air speed and engine R. P. M. necessary to establish a landing condition is characteristic of each craft. In one type of craft in which the present device was actually used the altitude, air speed and engine R. P. M. necessary to establish a landing condition were respectively 800 feet, 85 knots and 1400 R. P. M. These values have been indicated in Fig. 1 of the drawings purely for illustrative purposes and as an aid in explaining the invention. It is at once evident that if the altitude, air speed and engine R. P. M. of the craft under consideration are those necessary for landing the craft and if the locking device 9 is in an unlocked position, then the circuit previously referred to will be closed, the circuit extending from one terminal of the source 13 through the contacts 2 and 3 of the altimeter, the contacts 5 and 6 of the air speed indicator, the contacts 7 and 8 of the throttle, the contacts 10 and 11 of the locking device to the solenoid 12 and from thence to the remaining terminal of the source 13. The circuit described may be conveniently termed the primary circuit. This circuit may be designed to carry a low current such as, for example, a current of 80 milliamperes to thus eliminate any fire hazard in this part of the installation. Furthermore, such a low current value is not of sufficient strength to affect the operation of a magnetic compass in its immediate vicinity.

Energization of the solenoid 12 of the relay causes its associated armature 12' to engage the stationary contact 14 thereby closing a secondary or warning circuit which extends from one terminal of the source 13 through the contact 14 and armature 12' to the warning device 15 or the solenoid 16 of the electromagnet 17 and from thence to the remaining terminal of the source 13. The warning device 15 may be of any audible and/or visual type known to the prior art and, of course, serves to advise the pilot that the craft is in a landing condition with the landing gear in an inoperative or retracted position. However, in order to provide a warning device that the pilot cannot ignore I have equipped the control member of the craft with separable handle portions which when the craft is in a landing condition with its leading gear in an inoperative position will forcibly separate to thus advise the pilot of the impeding danger.

In Fig. 2 of the drawings and in the upper portion of Fig. 1 thereof there is shown a control stick 18 which is interiorly recessed to accommodate the electromagnet 17. The electromagnet may be any type known to the prior art but is here for illustrative purposes shown as a plunger type magnet, the plunger of which is identified by the reference character 119. To the upper part of the control stick 18 there is secured by suitable means 19 a handle portion 20. A cooperating handle portion 21 is pivotally mounted on handle portion 20 by means of the pin 22 in the manner shown and a spring 23 serves to forcibly move the handle portion 21 about its pivot 22 under conditions to be described subsequently. The spring 23 may be of any convenient strength and if desired may be sufficiently strong to cause the handle portions to be removed from the grasp of the pilot when the handle portion 21 assumes the dotted position shown in Fig. 1. Pins 24 and 25 extending respectively through the handle portions 20 and 21 serve as pivots for the interlocking members 26 and 27. The pivots 24 and 25 may if desired be equidistant from the pivot 22 so that the interlocking members 26 and 27 may conveniently engage each other. Springs 28 and 29 which engage respectively the interlocking members 26 and 27 and their associated handle portions urge these members into intimate engagement in the manner shown. The face engaging portions of the interlocking members 26 and 27 are machined and set at such an angle that their hold on each other is increased with the normal vibration of the airplane together with the pressure of springs 23, 28 and 29. At the same time the design of the interlocking members 26 and 27 is such that they can be readily disengaged by applying a relatively small force to one of them. For causing their disengagement a wire or other suitable means 30 interconnects the interlocking member 26 with the plunger 119 of the electromagnet. In Fig. 1 of the drawings the handle portions 20 and 21 assume the full line position when the airplane is in conditions other than a landing condition. When, however, the craft is in a landing condition with its retractable landing gear in such a position that the craft cannot be safely landed then the solenoid 16 is energized in the manner previously pointed out with the result that the plunger 119 causes the interlocking member 26 and 27 to disengage. This disengagement of the interlocking members results in a forcible separation of the handle portions 20 and 21 thus definitely advising the pilot of the impending danger.

A more detailed discussion of the operation of the device of my invention will serve to show that it will function only when the aircraft is in a landing condition with its landing gear in an inoperative or retracted position. As pointed out hereinbefore when the plane drops below the altitude, air speed and engine R. P. M. considered essential to the establishment of a landing condition and the landing gear is in an inoperative position, the necessary contacts will have been made in the primary circuit with attendant energization of the secondary circuit and actuation of the warning device 15 and separable handle portions 20 and 21. That the primary circuit will not close under conditions other than landing conditions will become apparent from a consideration of the following maneuvers. Let it be assumed that the aircraft in question is of a military type and that it is about to engage in the operation of dive bombing. When the craft rolls over into a dive the air speed and engine R. P. M. are such as to cause a closure of the electrical contact means associated with the air speed indicator 4 and the tachometer; but the electrical contact means associated with the altimeter 1 are open thus preventing closure of the primary circuit. When the craft pulls out of the dive below 800 feet, for example, the air speed and engine R. P. M. are sufficiently great to prevent the primary circuit from closing. Again when the military craft is used for straffing purposes the air speed and engine R. P. M. are sufficiently great to keep the primary circuit open. Finally when it becomes necessary to gain altitude rapidly after take-off and which necessitates retracting the landing gear shortly thereafter, the engine R. P. M. is sufficiently high to prevent the closure of the primary circuit. From the preceding discussion it will be seen that the primary circuit will close only under landing conditions with the landing gear in such a position that the craft cannot be safely landed. At this time the primary circuit closes with attendant actuation of the warning devices previously discussed herein. If the forcible separation of the handle portions 20 and 21 should cause the stick to be knocked out of the pilot's grasp the nose of the airplane will gradually rise there being a predetermined margin before the stalling stage is approached. There is no danger in this inasmuch as the airplane still has sufficient air speed and will merely go into a shallow climb. When the pilot increases his altitude or speed or places the landing gear in operative position the handle portions 20 and 21 can be reset and the airplane landed in a normal manner.

The circuits and their associated parts are easily installed in any aircraft and will increase the weight of the aircraft by an inappreciable amount. The fact that an airplane is equipped with a wheel in place of a stick for lateral and vertical control offers no difficulty insofar as the separable handle portions are concerned. Half segments of the wheel may be actuated by any suitable resilient means when interlocking members are released by the application of a suitable force. Wires or any other suitable means for applying this force may run from the interlocking means parallel to the spokes of the wheel and to an electromagnet or equivalent means located in the control column.

In the alternative embodiment of the invention shown in Fig. 3 of the drawings there is disclosed a cylinder or other suitably shaped chamber 31 which has one end thereof in communication with the ambient atmosphere by means of a conduit 32. The conduit 32 leads to a Pitot tube or other suitable device to thereby produce an air pressure within the chamber 31 which is proportional to the air speed of the craft. A piston 33 is movably mounted within the cylinder 31 and has associated therewith a spring 34 for moving the piston against the air pressure. It is thus evident that the piston will assume a position within the cylinder at which the forces exerted by the spring 34 and the air pressure on the piston will be in equilibrium, every position of the piston thus corresponding to a definite air speed of the crank. Movable pins 35, 36 and 37 are operable to assume positions within the cylinder so as to obstruct the movement of the piston 33. The pins 35, 36 and 37 are held in their obstructing positions within the cylinders by means of suitable springs which are only shown associated with the pins 36 and 37 and are identified by the reference characters 38 and 39. An altimeter 40 is provided with suitable electrical contacts 41 and 42 as was the altimeter in Fig. 1 of the drawings, these contacts being operable to engage each other at an altitude necessary to the establishment of a landing condition for the craft. A solenoid 43 surrounds the movable pin 35; and when the contacts 41 and 42 engage each other a circuit is closed which extends from one terminal of the source of electromotive force 44 to the electrical contacts 41 and 42 of the altimeter 40, from thence through the solenoid 43 and to the remaining terminal of the source 44. Under these circumstances the pin 35 is removed to a non-piston obstructing position from within the cylinder 31. The pin 36 is mechanically controlled by either a throttle 45 or a tachometer 46 for moving the same to a non-piston obstructing position when the engine R. P. M. is that essential to the establishment of a landing condition for the craft. Thus when the handle 47 of the throttle is in a position corresponding to the R. P. M. necessary for a landing condition the pin 36 is moved by means of a chord 48 guided by the pulley 49 to a position from within the cylinder where it no longer impedes the movement of the piston. Instead of using the throttle to move the pin 36 to a non-piston obstructing position the tachometer 46 may be alternatively employed. Only those portions of the tachometer have been shown which are necessary to an understanding of the invention and this is all that is deemed necessary since the tachometer is of the centrifugal type well known in the prior art. As the R. P. M.'s are reduced the spring 50 forces the weights 51 together thus causing the collar 52 secured thereto to move upwardly. The bar 53 which is in sliding engagement with the collar 52 moves in the same direction with the result that the pin 36 will assume a non-piston obstructing position when the R. P. M. approaches a value necessary for landing conditions since the pin 36 is connected to the bar 53 by means of a chord 54 guided by the pulley 55. In the full line position of the locking device the landing gear of the aircraft is in such a position that the craft can be safely landed. In this position the pin 37 controlled by the locking device 56 and connected thereto by the chord 57 guided by the pulley 58 assumes a position to obstruct the movement of the piston 33. When, however, the locking device is moved to its dotted position the landing gear is no longer locked with the result that it would be dangerous to attempt to land the craft. In this dotted position of the locking device the pin 37 is moved to a non-piston obstructing position from within the cylinder 31.

A piston rod 59 has insulatingly mounted thereon an annular, electrically conductive member 60 for engaging the stationary electrical contacts 61 and 62. The annular member 60 is in continuous engagement with contact 61 but commences engagement with the contact 62 only when the face of the piston 33 assumes the dotted line position 63. It of course can only assume this position when the pins 35, 36 and 37 have been removed from the cylinder interior so that they no longer can obstruct the movement of the piston 33. The spring 34 is of such strength that when the face of the piston 33 assumes the dotted line position 63 it will have a position that corresponds to the air speed essential to the establishment of a landing condition for the craft. When the annular member 60 engages both of the stationary electrical contacts 61 and 62 there is closed an electrical circuit which extends from one terminal of the source 44 through the contacts 61, 60, 62 to the warning device 15' and to the solenoid 16' of the electromagnet 17' and from thence to the remaining terminal of the source. The warning device 15' is identical with the device 15 shown in Fig. 1 of the drawings and hence what has been said with respect to this device applies with full force and effect to the warning device 15'. Likewise the control stick 18', the electromagnet 17' and its associated separable handle portions (not shown) are identical with the disclosures in Figs. 1 and 2 of the drawings and hence anything said in the specification hereinbefore concerning this structure applies also with full force and effect to the control member of Fig. 3.

In operation the device of Fig. 3 is so arranged that when the craft is in a landing condition with its wheels in a retracted position the pins 35, 36 and 37 will be removed from a piston obstructing position within the cylinder to thereby permit the face of the piston 33 to assume the dotted line position 63 or a position beyond this. This causes the annular member 60 to engage the stationary contacts 61 and 62 to thus close the warning circuit with attendant operation of the warning device 15' and energization of the solenoid 16'. The results flowing from setting in operation the warning device 15' and from energizing the solenoid 16' have been carefully described in connection with the embodiment of the invention depicted in Fig. 1 of the drawings and hence need not be repeated at this point. It is important to note that the warning circuit can only be energized when the landing gear is in an inoperative position and when the altitude, air speed and engine R. P. M. are those essential to the establishment of a landing condition for the craft. When those conditions essential to a landing condition for the craft do not obtain then the pins 35 or 36 or both may obstruct the movement of the piston 33 and prevent it from reaching its dotted line or circuit actuating position 63 or the airspeed of the craft alone may prevent the piston 33 from reaching the dotted line position 63.

According to the provisions of the patent statutes I have set forth the principle and mode of operation of my invention and have illustrated and described what I now consider to represent its best embodiments. However, I desire to have it understood that within the scope of the appended claims the invention may be practiced otherwise than as specifically illustrated and described.

The invention herein described and claimed may be used and/or manufactured by or for the Government of the United States of America for governmental purposes without the payment of any royalties thereon or therefor.

I claim:

1. A safety device for use on aircraft employing retractable landing gear, comprising in combination a chamber which is in communication with the ambient atmosphere to thereby produce a pressure therein which is proportional to the air speed of the craft, a piston movably mounted within said chamber and having resilient means associated therewith, said piston assuming a position in said chamber at which the forces exerted by the resilient means and the air pressure on the piston are in equilibrium, three movable members capable of being projected into said chamber and against any of which the piston assumes an abutting position but beyond this position assumes a position which corresponds to an air speed essential to the establishment of a landing condition for the craft, means which below a predetermined altitude and engine R. P. M. considered essential to the establishment of a landing condition for the craft causes two of the members to assume non-piston obstructing positions, means operable to cause the remaining movable member to assume a non-piston obstructing position only when the retractable gear is in such a position that the craft cannot be safely landed, an electrical circuit adapted to be closed by the piston when it assumes a position corresponding to the air speed considered essential to the establishment of a landing condition for the craft, and means responsive to the closure of said circuit for advising the pilot that the craft is in a landing condition with its retractable gear in such a position that the craft cannot be safely landed, said last mentioned means including a control member provided with separable handle portions which are arranged to be conveniently grasped by the pilot at least in conditions of the craft other than a landing condition, a spring engaging said handle portions and operable to cause their separation, a plurality of interlocking members for holding said handle portions against the action of the spring and in a position to be conveniently grasped by the pilot, and means for causing a disengagement of said interlocking members.

2. A control member for use on aircraft comprising a body provided with separable handle portions positioned to be grasped by the pilot for control purposes, a spring engaging said handle portions and operable to cause their separation, a plurality of interlocking members for holding said handle portions against the action of the spring and in a position to be conveniently grasped by the pilot, and means operable to cause a disengagement of said interlocking members.

3. A safety device for use on aircraft employing retractable landing gear, comprising means operable to advise the pilot when the said gear is in an inoperative position, means responsive to altitude, air speed and engine R. P. M. of the craft and to an inoperative position of the landing gear for actuating said first mentioned means, said second mentioned means being operative only when the altitude, air speed and engine R. P. M. are those essential to the establishment of a landing condition and when the retractable gear is in such a position that the craft cannot be safely landed, said first mentioned means including a control member provided with separable handle portions which are arranged to be conveniently grasped by the pilot at least in conditions of the craft other than a landing condition, and means for forcibly separating said handle portions.

4. A safety device for use on aircraft employing retractable landing gear, comprising means operable to advise the pilot when the said gear is in an inoperative position, means responsive to altitude, air speed and engine R. P. M. and to an inoperative position of the landing gear for actuating said first mentioned means, said second mentioned means being operative only when the altitude, air speed and engine R. P. M. are those essential to the establishment of a landing condition and when the retractable gear is in such a position that the craft cannot be safely landed.

5. A safety device for use on aircraft employing retractable landing gear, comprising in combination a chamber which is in communication with the ambient atmosphere to thereby produce a pressure therein which is proportional to the air speed of the craft, movable means within said chamber and adapted to assume a position therein dependent on the air pressure, means operable to obstruct the movement of said first mentioned means only when the altitude and engine R. P. M. of the craft are above those considered essential to the establishment of a landing condition and when the landing gear is in an operative position, and means operable to advise the pilot that the craft is in a landing condition with its retractable gear in an inoperative position when the first mentioned means assumes a position corresponding to an air speed essential for a landing condition, said last mentioned means including a control member provided with separable handle portions which are arranged to be conveniently grasped by the pilot at least in conditions of the craft other than a landing condition, and means for forcibly separating said handle portions.

6. A safety device for use on aircraft employing retractable landing gear, comprising in combination a chamber which is in communication with the ambient atmosphere to thereby produce a pressure therein which is proportional to the air speed of the craft, movable means within said chamber and adapted to assume a position therein dependent on the air pressure, means operable to obstruct the movement of said first mentioned means only when the altitude and engine R. P. M. of the craft are above those considered essential to the establishment of a landing condition and when the landing gear is in an operative position, and means operable to advise the pilot that the craft is in a landing condition with its retractable gear in an inoperative position when the first mentioned means assumes a position corresponding to an air speed essential for a landing condition.

7. A safety device for use on aircraft employing retractable landing gear, comprising in combination a chamber which is in communication with the ambient atmosphere to thereby produce a pressure therein which is proportional to the air speed of the craft, movable means within said chamber and adapted to assume a position therein dependent on the air pressure, means operable to allow unobstructed movement of said first mentioned means only below a predetermined altitude and engine R. P. M. considered essential to the establishment of a landing condition for the craft and when the retractable gear is in such a position that the craft cannot be safely landed, and means for advising the pilot that the craft is in a landing condition with its retractable gear in such a position that the craft cannot be safely landed when the first mentioned means assumes a position corresponding to the air speed considered essential to the establishment of a landing condition for the craft.

8. A safety device for use on aircraft employing retractable landing gear, comprising in combination a chamber which is in communication with the ambient atmosphere to thereby produce a pressure therein which is proportional to the air speed of the craft, a piston movably mounted within said chamber and having resilient means associated therewith, said piston assuming a position in said chamber at which the forces exerted by the resilient means and the air pressure on the piston are in equilibrium, three movable members capable of being projected into said chamber and against any of which the piston assumes an abutting position but beyond this position assumes a position which corresponds to an air speed essential to the establishment of a landing condition for the craft, means which below a predetermined altitude and engine R. P. M. considered essential to the establishment of a landing condition for the craft causes two of the members to assume non-piston obstructing positions, means operable to cause the remaining movable member to assume a non-piston obstructing position only when the retractable gear is in such a position that the craft cannot be safely landed, and means for advising the pilot that the craft is in a landing condition with its retractable gear in such a position that the craft cannot be safely landed when the piston assumes a position corresponding to the air speed considered essential to the establishment of a landing condition for the craft, said last mentioned means including a control member provided with separable handle portions which are arranged to be conveniently grasped by the pilot at least in conditions of the craft other than a landing condition, and means for forcibly separating said handle portions.

9. A safety device for use on aircraft employing retractable landing gear, comprising in combination a chamber which is in communication with the ambient atmosphere to thereby produce a pressure therein which is proportional to the air speed of the craft, a piston movably mounted within said chamber and having resilient means associated therewith, said piston assuming a position in said chamber at which the forces exerted by the resilient means and the air pressure on the piston are in equilibrium, three movable members capable of being projected into said chamber and against any of which the piston assumes an abutting position but beyond this position assumes a position which corresponds to an air speed essential to the establishment of a landing condition for the craft, means which below a predetermined altitude and engine R. P. M. considered essential to the establishment of a landing condition for the craft causes two of the members to assume non-piston obstructing positions, means operable to cause the remaining movable member to assume a non-piston obstructing position only when the retractable gear is in such a position that the craft cannot be safely landed, an electrical circuit adapted to be closed by the piston when it assumes a position corresponding to the air speed considered essential to the establishment of a landing condition for the craft, and means responsive to the closure of said circuit for advising the pilot that the craft is in a landing condition with its retractable gear in such a position that the craft cannot be safely landed.

10. A safety device for use on aircraft employing retractable landing gear, comprising in combination a chamber which is in communication with the ambient atmosphere to thereby produce a pressure therein which is proportional to the air speed of the craft, a piston movably mounted within said chamber and having resilient means associated therewith, said piston assuming a position in said chamber at which the forces exerted by the resilient means and the air pressure on the piston are in equilibrium, three movable members capable of being projected into said chamber and against any of which the piston assumes an abutting position but beyond this position assumes a position which corresponds to an air speed essential to the establishment of a landing condition for the craft, means which below a predetermined altitude and engine R. P. M. considered essential to the establishment of a landing condition for the craft causes two of the members to assume non-piston obstructing positions, means operable to cause the remaining movable member to assume a non-piston obstructing position only when the retractable gear is in such a position that the craft cannot be safely landed, and means for advising the pilot that the craft is in a landing condition with its retractable gear in such a position that the craft cannot be safely landed when the piston assumes a position corresponding to the air speed considered essential to the establishment of a landing condition for the craft.

11. A safety apparatus for use on aircraft employing retractable landing gear comprising in combination an altimeter, an air speed meter and an instrumentality each provided with means operable to make electrical contact respectively below a predetermined altitude, air speed and engine R. P. M. essential to the establishment of a landing condition for the craft, additional means operable to make electrical contact only when the retractable gear is in such a position that the craft cannot be safely landed, a first electrical circuit in which the last mentioned electrical contact making means and those associated with the altimeter, air speed meter and instrumentality are connected, a second electrical circuit adapted to be closed upon closure of the first mentioned circuit and including an electromagnet, a control member provided with separable handle portions which are arranged to be conveniently grasped by the pilot at least in conditions of the craft other than a landing condition, a spring engaging said handle portions and operable to cause their separation, a plurality of interlocking members for holding said handle portions against the action of the spring and in a position to be conveniently gasped by the pilot, and means interconnecting one of said interlocking members and the aforesaid electromagnet, whereby upon energization of the second mentioned circuit the interlocking members are caused to disengage with attendant forcible separation of the handle portions by operation of the aforesaid spring, to thus advise the pilot that the craft is in a landing condition with its retractable gear in such a position that the craft cannot be safely landed.

12. A safety apparatus for use on aircraft employing retractable landing gear comprising in combination an altimeter, an air speed meter and an instrumentality each provided with means operable to make electrical contact respectively below a predetermined altitude, air speed and engine R. P. M. essential to the establishment of a landing condition for the craft, additional means operable to make electrical contact only when the retractable gear is in such a position that the craft cannot be safely landed, an electrical circuit in which the last mentioned electrical contact making means and those associated with the altimeter, air speed meter and instrumentality are connected, and means responsive to a closure of said electrical circuit for advising the pilot that the craft is in a landing condition with its retractable gear in such a position that the craft cannot be safely landed, said last mentioned means including a control member provided with separable handle portions which are arranged to be conveniently grasped by the pilot at least in conditions of the craft other than a landing condition, and means for forcibly separating said handle portions.

13. A safety apparatus for use on aircraft employing retractable landing gear comprising in combination an altimeter, an air speed meter and an instrumentality each provided with means operable to make electrical contact respectively below a predetermined altitude, air speed and engine R. P. M. essential to the establishment of a landing condition for the craft, additional means operable to make electrical contact only when the retractable gear is in such a position that the craft cannot be safely landed, a first electrical circuit in which the last mentioned electrical contact making means and those associated with the altimeter, air speed meter and instrumentality are connected, a second electrical circuit adapted to be closed upon closure of the first mentioned circuit, and means responsive to the closure of the second mentioned circuit for advising the pilot that the craft is in a landing condition with its retractable gear in such a position that the craft cannot be safely landed.

14. A safety apparatus for use on aircraft employing retractable landing gear comprising in combination an altimeter, an air speed meter and an instrumentality each provided with means operable to make electrical contact respectively below a predetermined altitude, air speed and engine R. P. M. essential to the establishment of a landing condition for the craft, additional means operable to make electrical contact only when the retractable gear is in such a position that the craft cannot be safely landed, an electrical circuit in which the last mentioned electrical contact making means and those associated with the altimeter, air speed meter and instrumentality are connected, and means responsive to a closure of said electrical circuit for advising the pilot that the craft is in a landing condition with its retractable gear in such a position that the craft cannot be safely landed.

15. A safety apparatus for use on aircraft employing retractable landing gear comprising in combination an altimeter, an air speed meter and an instrumentality each provided with means operable to make electrical contact respectively below a predetermined altitude, air speed and engine R. P. M. essential to the establishment of a landing condition for the craft, additional means operable to make electrical contact only when the retractable gear is in such a position that the craft cannot be safely landed, an electrical circuit in which the last mentioned electrical contact making means and those associated with the altimeter, air speed meter and instrumentality are serially connected, and means responsive to a closure of said electrical circuit for advising the pilot that the craft is in a landing condition with its retractable gear in such a position that the craft cannot be safely landed.

16. A safety apparatus for use on aircraft employing retractable landing gear comprising in combination an altimeter, an air speed meter and a throttle each provided with means operable to make electrical contact respectively below a predetermined altitude, air speed and engine R. P. M. essential to the establishment of a landing condition for the craft, additional means operable to make electrical contact only when the retractable gear is in such a position that the craft cannot be safely landed, an electrical circuit in which the last mentioned electrical contact making means and those associated with the altimeter, air speed meter and throttle are connected, and means responsive to a closure of said electrical circuit for advising the pilot that the craft is in a landing condition with its retractable gear in such a position that the craft cannot be safely landed.

17. A safety apparatus for use on aircraft employing retractable landing gear comprising in combination an altimeter, an air speed meter and a tachometer each provided with means operable to make electrical contact respectively below a predetermined altitude, air speed and engine R. P. M. essential to the establishment of a landing condition for the craft, additional means operable to make electrical contact only when the retractable gear is in such a position that the craft cannot be safely landed, an electrical circuit in which the last mentioned electrical contact making means and those associated with the altimeter, air speed meter and tachometer are connected, and means responsive to a closure of said electrical circuit for advising the pilot that the craft is in a landing condition with its retractable gear in such a position that the craft cannot be safely landed.

18. A safety device for use on aircraft employing retractable landing gear comprising a control member provided with separable handle portions which are arranged to be conveniently grasped by the pilot at least in conditions of the craft other than a landing condition, a spring engaging said handle portions and operable to cause their separation, a plurality of interlocking members for holding said handle portions against the action of the spring and in a position to be conveniently grasped by the pilot, an electromagnet operatively connected with one of said interlocking members, and means for energizing said electromagnet to cause a disengagement of said interlocking members only when the craft is in a landing condition with its retractable gear in such a position that the craft cannot be safely landed, thereby causing a forcible separation of the handle portions by operation of the aforesaid spring to thus advise the pilot of the impending danger.

19. A safety device for use on aircraft employing retractable landing gear comprising a control member provided with separable handle portions which are juxtaposed at least in conditions of the craft other than a landing condition, means responsive to altitude, air speed and engine R. P. M. of the craft and to an inoperative position of the landing gear for forcibly separating said handle portions, said means being operative only when the altitude, air speed and engine R. P. M. are those essential to the establishment of a landing condition and when the retractable gear is in such a position that the craft cannot be safely landed.

20. A control member for use on aircraft comprising a body provided with separable handle portions, said handle portions being mounted for relative movement with respect to each other and being positioned to be grasped by the pilot for control purposes, means engaging said handle portions and operable to cause their separation, means for holding said handle portions against the action of the first mentioned means and in a position to be conveniently grasped by the pilot, and means for rendering said second mentioned means inoperative.

ROBERT F. JONES.